US009840110B2

(12) United States Patent
Dingle et al.

(10) Patent No.: US 9,840,110 B2
(45) Date of Patent: Dec. 12, 2017

(54) FACE TO RIM CONNECTION FOR A COMPOSITE WHEEL

(71) Applicant: Carbon Revolution Limited, Waurn Ponds (AU)

(72) Inventors: Matthew Edward Dingle, Torquay (AU); Ashley James Denmead, Belmont (AU); Michael Silcock, Caufield North (AU)

(73) Assignee: Carbon Revolution Limited, Waurn Ponds (AU)

( * ) Notice: Subject to any disclaimer, the term of this patent is extended or adjusted under 35 U.S.C. 154(b) by 152 days.

(21) Appl. No.: 14/781,199

(22) PCT Filed: Jun. 17, 2013

(86) PCT No.: PCT/AU2013/000648
§ 371 (c)(1),
(2) Date: Sep. 29, 2015

(87) PCT Pub. No.: WO2014/165895
PCT Pub. Date: Oct. 16, 2014

(65) Prior Publication Data
US 2016/0052335 A1  Feb. 25, 2016

(30) Foreign Application Priority Data

Apr. 11, 2013  (AU) ................................. 2013204015

(51) Int. Cl.
*B60B 5/02*  (2006.01)
*B60B 1/14*  (2006.01)
(Continued)

(52) U.S. Cl.
CPC ................ *B60B 1/14* (2013.01); *B29C 70/46* (2013.01); *B32B 1/00* (2013.01); *B32B 1/04* (2013.01);
(Continued)

(58) Field of Classification Search
CPC . Y10T 428/192; B60B 5/02; B60B 2360/341; B60B 2360/3416; B60B 2360/3422; B60B 2360/3462
See application file for complete search history.

(56) References Cited

U.S. PATENT DOCUMENTS 7,361,296 B2  4/2008  Adrian
2013/0057050 A1  3/2013  Matsui et al.

FOREIGN PATENT DOCUMENTS

DE  102011077834 A1  12/2012
JP  60-208217 A  10/1985
(Continued)

OTHER PUBLICATIONS

International Search Report dated Aug. 28, 2013 for International Application No. PCT/AU2013/000648, International Filing Date Jun. 17, 2013 by Carbon Revolutionary Pty Ltd., 3 pages.

*Primary Examiner* — Alexander Thomas
(74) *Attorney, Agent, or Firm* — Cesari and McKenna, LLP; Omar M. Wadhwa (57) ABSTRACT

A connection (110) between a rim portion (102) and a face portion (104) of a composite wheel (100). The rim portion (102) comprises a first set of fibers (122). The face portion (104) comprises a second set of fibers (124). The connection (110) comprises a transition zone (120) in which the first set of fibers (122) and the second set of fibers (124) are arranged in a layered structure. Each layer (125A, 125B, 125C) of the layer structure includes a first section (127) including an arrangement of the first set of fibers (122), and a first connection end (128), and a second section (129) including an arrangement of the second set of fibers (124), and a second connection end (130). The first connection end (128) is arranged adjacent to or abutting the second connection end (130) forming a layer joint (132A, 132B, 132C). The
(Continued)

layer joint (132A, 32B, 132C) of each adjoining layer (125A, 125B, 125C) is spaced apart in a stepped configuration.

19 Claims, 2 Drawing Sheets

(51) Int. Cl.
| | |
|---|---|
| *B32B 5/12* | (2006.01) |
| *B60B 3/02* | (2006.01) |
| *B29C 70/46* | (2006.01) |
| *B32B 5/02* | (2006.01) |
| *B32B 5/28* | (2006.01) |
| *B60B 21/06* | (2006.01) |
| *B32B 5/10* | (2006.01) |
| *B32B 5/22* | (2006.01) |
| *B32B 5/24* | (2006.01) |
| *B32B 1/00* | (2006.01) |
| *B32B 1/04* | (2006.01) |
| *B32B 3/02* | (2006.01) |
| *B32B 3/08* | (2006.01) |
| *B29L 31/32* | (2006.01) |

(52) U.S. Cl.
CPC .................. *B32B 3/02* (2013.01); *B32B 3/08* (2013.01); *B32B 3/085* (2013.01); *B32B 5/022* (2013.01); *B32B 5/024* (2013.01); *B32B 5/10* (2013.01); *B32B 5/12* (2013.01); *B32B 5/22* (2013.01); *B32B 5/24* (2013.01); *B32B 5/28* (2013.01); *B60B 3/02* (2013.01); *B60B 5/02* (2013.01); *B60B 21/06* (2013.01); *B29L 2031/32* (2013.01); *B32B 2260/023* (2013.01); *B32B 2260/046* (2013.01); *B32B 2262/106* (2013.01); *B32B 2307/50* (2013.01); *B32B 2307/518* (2013.01); *B32B 2307/54* (2013.01); *B32B 2605/00* (2013.01); *B32B 2605/08* (2013.01); *B32B 2605/18* (2013.01); *B60B 2310/00* (2013.01); *B60B 2360/3416* (2013.01); *B60B 2360/362* (2013.01); *B60B 2900/111* (2013.01); *B60B 2900/311* (2013.01)

(56) References Cited

FOREIGN PATENT DOCUMENTS

| JP | 61-044001 A | 3/1986 |
|---|---|---|
| JP | 09-099703 A | 4/1997 |
| WO | WO 2010/024495 A1 | 3/2010 |

FACE TO RIM CONNECTION FOR A COMPOSITE WHEEL

CROSS REFERENCE TO RELATED APPLICATIONS

This application is the National Stage of International Application No. PCT/AU2013/000648, filed on Jun. 17, 2013, which claims the benefit of Australian Patent Application No. 2013204015, filed on Apr. 11, 2013. The contents of both applications are hereby incorporated by reference in their entirety.

TECHNICAL FIELD

The present invention generally relates to a connection between the face portion and the rim portion of a composite wheel. The invention is particularly applicable to composite carbon fibre wheels for vehicles and/or aeroplanes and it will be convenient to hereinafter disclose the invention in relation to that exemplary application. However, it is to be appreciated that the invention is not limited to that application and could be used to connect face and rim portions of a large variety of wheels.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

A composite wheel generally includes two main sections, a rim portion and a face portion. The rim portion comprises an annulus structure configured to receive and seat a tyre. The face portion includes a hub which is used to fix the wheel to the vehicle, and a connection structure such as a series of spokes or a disc which extends between and interconnects the hub and the rim. Lateral, vertical and torsional loads are transmitted through the tyre to the rim portion of the wheel which then produce bending and torsional stresses in the connection structure.

The Applicant has produced a one-piece composite wheel, which is described, for example, in International Patent Publication WO2010/024495A1. The creation of a one-piece composite wheel generally necessitates use of a separate rim portion mold and associated reinforcement and face portion mold and associated reinforcement. The separate rim and face mold portions are then interconnected in a final molding process which allows the overall composite wheel to be integrally formed. A stiff, strong connection between the rim portion and the face portion, in particular the connection between the spokes and the rim, is required to provide a mechanically efficient structure having stiffness and strength and also efficiently transmit loads generated between the tyre and road, through the rim and spokes.

Previous proposed connections between the rim portion and the face portion structures of composite wheels have used a bolted connection or an adhesive bond to interconnect the connection structure and rim. However, these forms of connection can add significant mass to the wheel, require joining structures which can provide stress points in the wheel structure and configuration, and/or can form a weak bond between the adjoining portions of the wheel. The Applicant is aware that a number of these types of connections have been the subject of mechanical failure when tested under normal road conditions.

It would therefore be desirable to provide an improved or alternate connection between the rim portion and the face portion of a composite wheel.

SUMMARY OF THE INVENTION

The present invention provides in a first aspect, a connection between a rim portion and a face portion of a composite wheel. The rim portion comprises a first set of fibres. The face portion comprises a second set of fibres. The connection comprises a transition zone in which the first set of fibres and the second set of fibres are arranged in a layered structure. Each layer of the layer structure includes a first section including an arrangement of the first set of fibres, and a first connection end, and a second section including an arrangement of the second set of fibres, and a second connection end. The first connection end is arranged adjacent to or abutting the second connection end forming a layer joint. The layer joint of each adjoining layer is spaced apart in a stepped configuration.

The present invention therefore provides a connection between a rim portion and a face portion of a composite wheel in which fibres from each of the rim portion and the face portion are brought together in the transition zone at a layer joint. The layer joint of adjoining layers are spaced apart in a stepped configuration in order to strengthen the joint structure. This stepped configuration results in the upper and lower layers of the layered structure bridging the layer joint of the intermediary layer, thereby interconnecting the first and second section of that intermediary layer. The stepped structure also ensures that the layer joint of one layer is aligned with another proximate layer joint.

The fibres used in the connection, including the first fibres and second fibres, are preferably flexible and more preferably flexible and compliant. The flexibility and compliance of the fibres enables the rim portion and face portion to be assembled and then move the components of the connection back into position to create connection between the rim portion and face portion of the composite wheel.

The transition zone is preferably spaced away from the position/point where the rim portion meets the face portion of the composite wheel. The arrangement allows for the connection between the rim and face and associated layer joints to be made at a position which is spaced away from the point at which the structure of the face portion meets the structure of the rim portion. This is advantageous since the point where the face portion meets the rim portion is an area where the stresses in the structure are high during certain operational loading conditions.

It should be understood that the term composite herein denotes any type of composite material comprising fibres, cured or uncured, irrespective of the structure being layered or not. Furthermore, pre-forms and pre-consolidated pre-forms cured or uncured are important subgroups of composite materials and bodies.

The transition zone has a layered structure. The number of layers may vary considerably depending on the design of the connection and the size and type of composite members. In some embodiments, only a few, for example 2, 3, 4, 6 or 10 layers are used. In other embodiments, a higher number, for example 20, 30, 50, 100 or more layers are needed to obtain the desired quality and/or properties of the connection.

The layer joint of adjacent layers can be spaced apart in any relative orientation within the layered structure. For example, where the layers include angles, curves or bends, one or more layer joint may be spaced apart at a particular angle relative to an adjacent layer joint. In other embodiments, for example planar layers, the layer joints of each layer are laterally spaced apart from the respective layer joint of each adjoining layer. The spacing between layer joints can be selected to suit a specific configuration, application or geometry. In some embodiments, the layer joint of each adjoining layer is spaced apart with different lateral spacing between some of, or all of, the respective layer joints. In other embodiments, the layer joint of each adjoining layer is spaced apart with substantially the same lateral spacing.

In some embodiments, the connection is formed in a location in the composite wheel in which the direction or draft of the geometry between the rim portion and face portion changes. In other embodiments, the connection is formed close to the inside edge of the rim. Preferably, the first fibres of the connection extend at an angle from an edge portion of the rim portion of the composite wheel. Similarly, the second fibres of the connection preferably extend at an angle from a section of the face portion of the composite wheel. The angle is preferably between 60 to 110°, more preferably between 75 to 100°, and yet more preferably about 90°. The rim portion and face portion can then be interconnected at the transition zone.

In some embodiments, the composite wheel is formed about a central wheel axis. The face portion comprises second fibres substantially radially aligned relative to the wheel axis and the rim portion is formed from first fibres substantially axially aligned relative to the wheel axis. The connection is formed from second fibres extending from the face portion axially aligned relative to the wheel axis and first fibres extending from the rim portion axially aligned relative to the wheel axis. Preferably, the rim portion includes an edge flange or lip portion which extends at an angle relative to the axis. In some embodiments, the first fibres of the connection extend from the edge flange portion of the rim portion.

In order to create a strong fibre tie between the rim portion, face portion and the connection, it is preferred that at least some of the first fibres from the transition zone extend into the rim portion and at least some of the second fibres of the transition zone extend into the face portion of the composite wheel. In some embodiments, at least a portion of the second fibres in the transition zone include a first set of second fibres which extend into a front portion of the face portion and a second set of second fibres which extend into a rear portion of the face portion of the composite wheel.

As noted above, the fibres used in the connection, including the first fibres and second fibres, are preferably flexible and more preferably flexible and compliant. The flexibility and compliance of the fibres and preferred positioning/configuration of the fibres (as described above) enables the rim portion and and face portion to be assembled and then move the components of the connection back into position to provide a structurally sound connection between the rim and face. The connection can therefore make use of the compliance of the fabric for flexibility during layup and also to create a structurally sound connection in that area that is not coincident with the point at which the hub and face portions join. This is advantageous since this is an area where the stresses in the structure are high during certain operational loading conditions.

The stepped configuration can have any desired configuration. In some instances, the step configuration has a curved profile. In other embodiments, the stepped configuration has a progressive configuration. In yet other embodiments, the step configuration has an oscillating and/or a sinusoidal configuration. In a preferred embodiment, the stepped configuration comprises a linear stepped arrangement.

The layer structure preferably comprises a plurality of stacked layers. Within each layer of the layer structure preferably comprises a coplanar arrangement of the first section and second section.

A wide variety of fibres may be used in the present invention, including but not limited to fibres selected from the group consisting of carbon fibres, glass fibres, aramid fibres, synthetic fibres such as acrylic, polyester, PAN, PET, PE, PP or PBO-fibres, or the like, bio fibres such as hemp, jute, cellulose fibres, or the like, mineral fibres for example Rockwool or the like, metal fibres for example steel, aluminium, brass, copper, or the like, boron fibres or any combination of these. In a preferred embodiment, the first set of fibres and the second set of fibres comprise carbon fibres.

The fibres may be provided in any desirable orientation in the transition zone like for example unidirectional, biaxial or random or a combination of these. In some embodiments, each layer in the transition zone comprises oriented fibres, preferably unidirectional fibres and/or biaxial fibres. However, the fibres are preferably oriented to reduce the stress between the transition zone and the composite members and/or reduce the stress between the composite members as well as to strengthen areas of the final structure which will be exposed to a higher stress during service. The orientation of fibres may or may not be the same in all the layers comprising fibres within the transition zone. For example, one or more layers of fibres may be oriented in another manner than other layers, if a stress analysis suggests a multi-axial fibre orientation. However, in other embodiments the fibres may be oriented substantially the same way in all the layers of fibres.

Once molded and formed into a composite wheel, the connection including the transition zone, the rim portion and the face portion comprise a matrix material, such as resin, metal, and fibres. The fibres may be provided in any suitable form including in prepregs, semi-pregs, woven or non-woven fabrics, mats, pre-forms, pre-consolidated pre-forms, individual or groups of fibres, tows, tow-pregs, or the like. During lay-up (preparing up to the point before consolidation and/or setting, curing or the like of the matrix material) of a connection, the matrix material need not be comprised in the layers comprising fibres (e.g. a prepreg or semi-preg) or between the layers comprising fibres. However, the matrix material should form a continuous matrix after setting occurs.

The matrix material need not be comprised in or between two adjacent layers comprising fibres. In a preferred embodiment an adhesive may in this case be provided between at least some of such pairs of layers to at least temporarily and at least partially fix the adjacent layers comprising fibres.

It is to be understood that prepreg refers to a substantially or fully impregnated collection of fibres, fibre tows, woven or non-woven fabric or the like. Similarly, it is to be understood that semi-preg refers to a partially impregnated collection of fibres or fibre tows. The partial impregnation provides for enhanced removal of gas through or along the dry fibres during consolidation and/or curing. An example of a semi-preg is a partially impregnated layer of fibres.

It is to be understood that woven and non-woven fabrics are collections of individual fibres or fibre tows which are substantially dry, i.e. not impregnated by a matrix material, such as resin. It should also be understood that fibre tows are bundles of a large number of individual fibres, for example 1000's, 10000's or 100000's of fibres. Tow-pregs are at least partially impregnated fibre tows.

The connection and transition zone thereof may be prepared as a pre-form. In such an embodiment, each of the first section and second section are formed into a tailored fibre preform having a desired shape and fibre orientation. It is to be understood that a pre-form is a composite material comprising fibres. In some instances the preform may also include an uncured matrix material such as a resin. Some preforms may substantially comprise dry fibres with no matrix material. A binder may be used to assist holding the plies together before the matrix material has been injected.

The fibres are preferably provided in layers of oriented fibres, for example individual or groups of fibres, fibre tows, fibre tow-pregs, prepregs, semi-pregs, woven or non-woven fabrics or mats. In preferred embodiments, the first set of fibres and the second set of fibres are provided as at least one fabric sheet or ply, and more preferably as multi-axial fabric sheets or plys.

In some embodiments, the first connection end and the second connection end may be only interconnected by the adjoining layers and a matrix material impregnated therein. In other embodiments, the first connection end and the second connection end can be physically interconnected, for example stitched or woven together. This type of interconnection can be advantageous in those embodiments where the first section and second section of each layer are formed from fabrics, the fabric ends being woven, stitched together or otherwise joined to strengthen the intralayer bond between these sections.

The layers of the layered structure are preferably orientated in a direction which adds strength to the structure of the composite wheel. The layers of the layered structure are therefore preferably aligned with one or more sections of ether the rim portion or the face portion of the composite wheel. In some embodiments, the layers of the layered structure of the transition zone are substantially parallel to a surface of at least one of the rim portion or the face portion of the wheel. In a preferred embodiment, the layers of the layered structure of the transition zone are substantially parallel to a surface of the rim portion. The transition zone preferably comprises a connection portion between the rim portion and a spoke section of the face portion of a composite wheel.

The connection preferably further comprises at least one capping layer substantially extending over the stepped configuration of the layer joints. The capping layer provides a final layer of reinforcement over the layer joint proximate the outer surface of the connection, and provides a finishing layer preferably matching the outer surface of adjoining sections of the composite wheel. The capping layer therefore preferably comprises a layer comprising an arrangement of the first set of fibres, or the second set of fibres. The selection of fibres substantially depends on the type of fibres (first or second) of adjoining sections of the composite wheel.

The fibres of the connection, rim portion and/or face portion are preferably injected and/or impregnated with matrix material and then cured, set or the like. The connection therefore preferably further comprises a matrix material enveloping the first fibres and second fibres. Any suitable matrix material can be used. In some embodiments, a resin is used. The resin is preferably based on unsaturated polyester, polyurethane, polyvinyl ester, epoxy, thermoplastics, similar chemical compounds or combinations thereof. In a preferred embodiment, the resin is epoxy-based. In other embodiments, the matrix material comprises a metal matrix, forming a composite metal matrix with the fibres when set. The metal matrix material is preferably selected from aluminium, magnesium, titanium, iron and combinations, alloys and mixtures thereof.

The composite wheel is preferably formed as a unitary body. This typically involves simultaneous injection and/or impregnation of matrix material and then curing, setting or the like of each portion of the composite wheel. In such embodiments, each of the rim portion and the face portion are preferably at least partially uncured at the time when the connection is prepared. The connection portion is preferably integrally formed with the composite wheel.

The present invention provides in a second aspect, a method for connecting a rim portion and a face portion of a composite wheel, the rim portion of the composite wheel comprising a first set of fibres and the face portion of the composite wheel comprising a second set of fibres, the method comprising the steps of:

providing in a first layer a first section including an arrangement of the first set of fibres, and a first connection end, and a second section including an arrangement of the second set of fibres, and a second connection end, the first connection end being arranged adjacent to or abutting the second connection end forming a first layer joint;

providing at least one further layer over the first layer, the further layer having a first section including an arrangement of the first set of fibres, and a first connection end, and a second section including an arrangement of the second set of fibres, and a second connection end, the first connection end of the further layer being arranged adjacent to or abutting the second connection end of the further layer forming a second layer joint;

wherein the layer joint of each adjoining layer is spaced apart in a stepped configuration.

Any number of further layers having a similar configuration as the first may be provided over the first layer. In some embodiments, three, four, five, ten, or more layers are used. In other embodiments, a higher number, for example 20, 30, 50, 100 or more layers are needed to obtain the desired quality and/or properties of the connection.

The method of the second aspect of the present invention preferably forms a connection according to the first aspect of the present invention.

The method preferably includes the further step of: providing a final capping layer substantially extending over the stepped configuration of the layer joints.

Again, the fibres of the connection, rim portion and/or face portion are preferably injection and/or impregnated with matrix material and then cured and/or set. The method therefore preferably further includes the steps of:

providing a matrix material in contact with each of the layers of the connection; and curing the connection.

It should be appreciated that curing of the matrix material and the associate part such as the connection, wheel or similar encompasses curing, setting, drying or similar processes.

Again, the composite wheel is preferably formed as a unitary body. The method therefore preferably further includes the steps of:

concurrently providing a matrix material in contact with each rim portion and the face portion of the wheel; and co-curing the rim portion and the face portion of the wheel.

Where the matrix material comprises a resin, a variety of resin delivery systems can be used with the method of the second aspect. In some embodiments, at least a part of the resin is provided by Resin Infusion and/or Resin Transfer Molding and/or Vacuum Assisted Resin Transfer Molding.

The fibres for at least one of the layers preferably comprise fibres provided as one or more prepregs, semi-pregs, woven or non-woven fabrics, mats, pre-forms, pre-consolidated pre-forms, individual or groups of fibres, tows, towpregs or a combination thereof.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
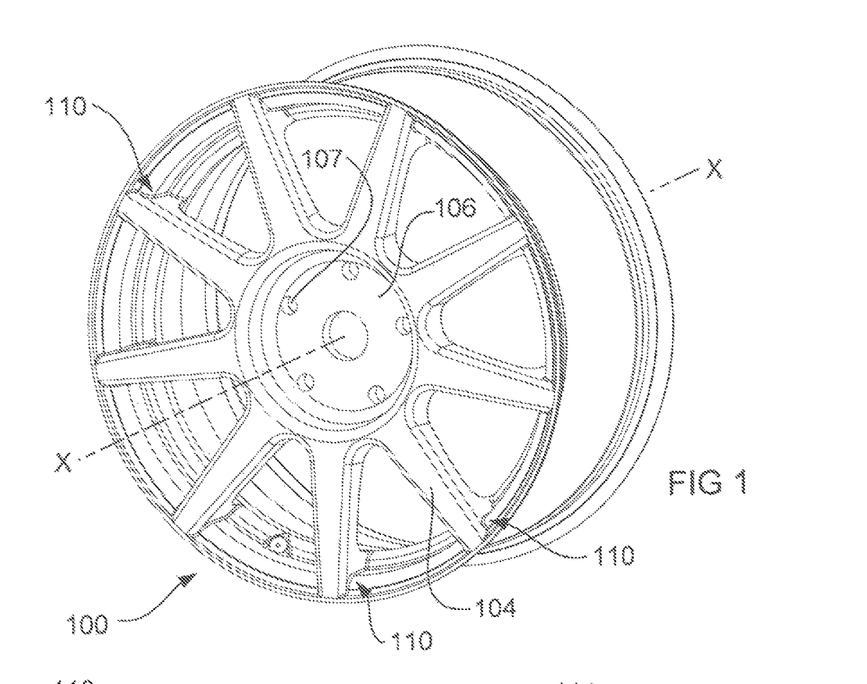
FIG. 1 is a perspective view of a composite wheel including a connection between a face portion and rim portion thereof according to one embodiment of the present invention.

Referring firstly to FIG. 1, there is shown a perspective view of a composite wheel 100 which includes the connection 110 of the present invention. The illustrated composite wheel 100 has been developed by the Applicant as being formed as a one-piece body. The general process of manufacture of the composite wheel 100 is described in International Patent Publication WO2010/024495A1, the contents of which are to be understood to be incorporated into this specification by this reference.

The illustrated composite wheel 100 includes two main sections:

A). a rim portion 102 comprises an annulus structure onto which a tyre (not illustrated) is mounted; and
B). a face portion 104 comprising a circular hub 106 and a series of spokes 108. The hub 106 includes five fastening apertures 107 configured to received fastening bolts (not illustrated) used to fix the wheel to a wheel mount of a vehicle. The spokes 108 comprise elongate arms connected to the hub 106 at one end and the rim portion 102 at another end.

As described in International Patent Publication WO2010/024495A1, the creation of such a one-piece composite wheel 100 necessitates use of a separate rim portion mold (not illustrated) and face portion mold (not illustrated). In use, the rim portion 102 is formed by laying up a first set of fibres typically embodied in a reinforcement fabric seated in the rim portion mold, and the face portion 104 is formed by separately laying up a second set of fibres, typically embodied in a reinforcement fabric seated in the face portion mold. The face portion mold includes an inner bucket mold and an outer cylindrical mold. The reinforcement fabric from the rim portion mold and face portion mold are then assembled together in a combined mold, with the separate portions being Interconnected at a connection point 110. A final molding process is then undertaken in which matrix material, such as a resin can be injected and/or infused into the reinforcement of the overall wheel form to produce a molded single piece wheel 100.

A mechanically efficient connection between the rim portion 102 and face portion 104, and in particular each spoke to rim connection 110 is important to provide stiffness and strength to the wheel 100. In this respect, lateral, vertical and torsional loads are transmitted through a tyre to the rim portion 106 of the wheel 100. These loads transmit bending and torsional stresses through the spokes 108 that need to be resolved efficiently at each spoke to rim connection 110.

The spoke to rim connection 110 of the present invention is formed through the interconnection of the rim reinforcement and face reinforcement of the rim portion 102 and face portion 104 of the composite wheel 100. This connection 110 is shown in more detail in FIGS. 2 and 3.

Figure 2:
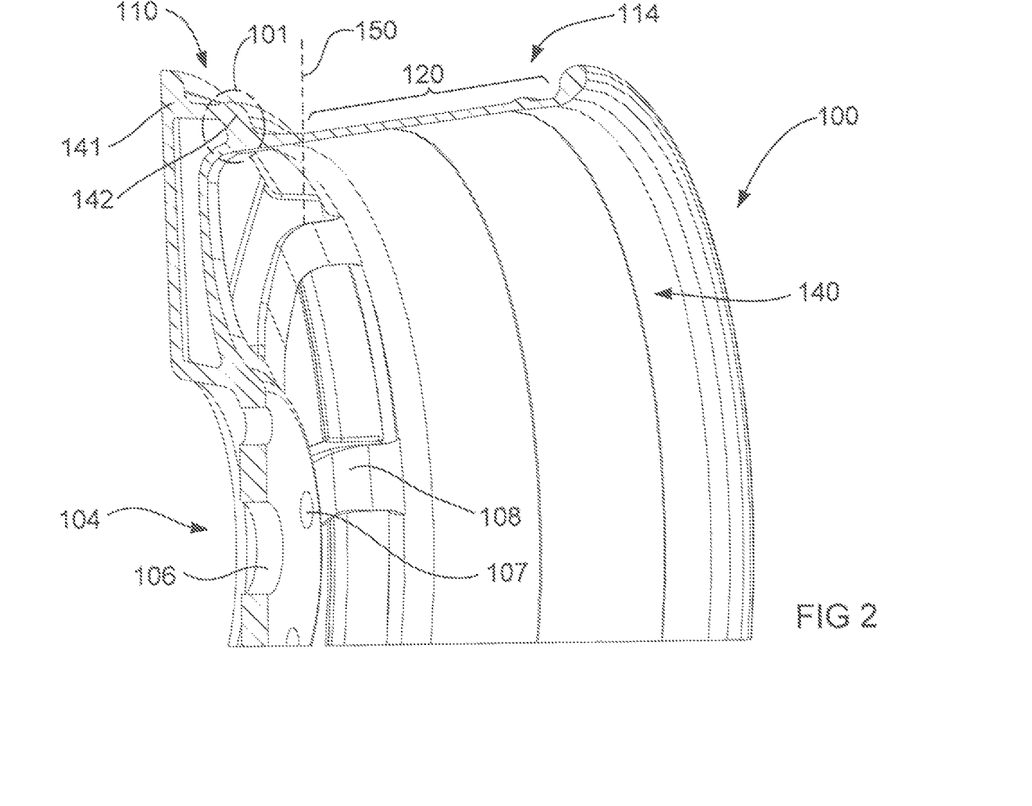
FIG. 2 is a more detailed view of the rim to face connection region of the composite wheel shown in FIG. 1.

Referring firstly to FIG. 2, there is shown a more detailed view of the spoke to rim connection 110 of the composite wheel 100 shown in FIG. 1. Externally, the connection region 110 is orientated with the outer surface 114 of the rim portion 102 and is configured to blend into that configuration.

Figure 3:
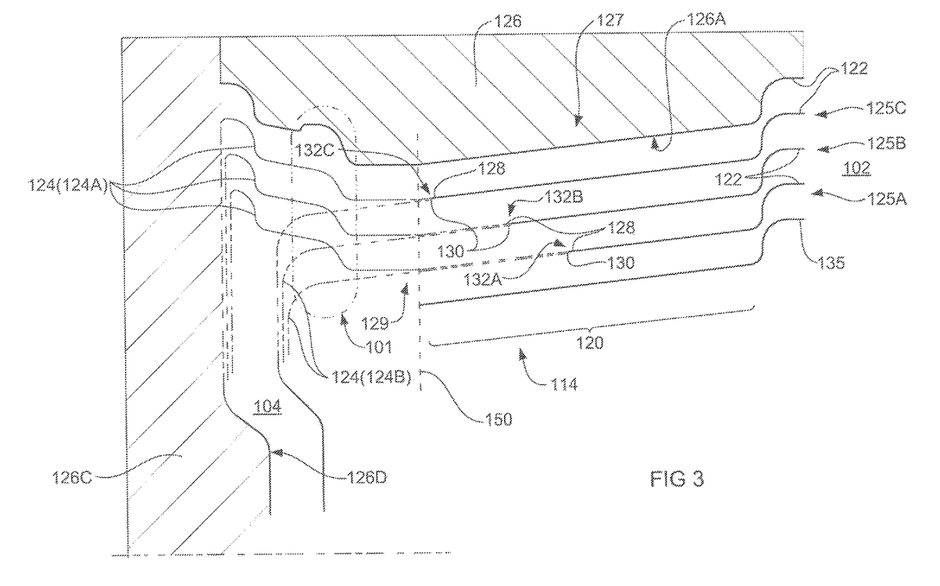
FIG. 3 provides a schematic representation of the structural reinforcement components for the connection between the rim portion and the face portion of the composite wheel shown in FIGS. 1 and 2.

Referring now to FIG. 3, there is shown a schematic representation of the structural reinforcement components for the connection 110 between the rim portion 102 and the face portion 104 of the composite wheel 100 shown in FIGS. 1 and 2. The illustrated connection 110 is formed in a transition zone 120 between the rim portion 102 and face portion 104 of the wheel 100. In the transition zone 120, a section of first fibres 122 from the rim portion 102 are interconnected with a section of second fibres 124 from the face portion 104 of the composite wheel 100. The fibres 122, 124 of the transition zone 120 are formed on top of and aligned with the reinforcement fibres 122 of the rim portion 102. The reinforcement fibres 122 of the rim portion 102 are illustrated in FIG. 3 as being held against a mold face 126A of the rim tool 126 of the rim portion 102. The fibres 122, 124 of the transition zone 120 laterally attach to the face mold portion 104. The reinforcement fibres 124 of the face portion 104 are illustrated in FIG. 3 as being held against a mold face 126D of the face tool 126C.

The illustrated transition zone 120 includes coplanar layers 125A, 125B and 125C of the first set of fibres 122 and the second set of fibres 124 arranged in a stacked layered structure. The illustrated representation has three layers 125A, 125B and 125C. However, it should be appreciated that the number of layers may vary considerably dependent on the design of the connection and the size and type of composite members. In some cases only a few, for example 2, 3, 4, 6 or 10 layers are used whereas in other cases a higher number, for example 20, 30, 50, 100 or more layers are needed to obtain the desired quality and properties of connection.

The second set of fibres 124 comprise fibres or sheets which extend into the structure of the face portion 104. In the illustrated arrangement, the second set of fibres 124 include a first set of fibres 124A which extend to a front portion of the face portion 104 and a second set of fibres 124B which extend to a rear portion of the face portion 104. For example, where the face portion comprises one or more spokes (not illustrated in FIG. 3), the first set of fibres 124A would extend to a front portion of the spokes and a second set of fibres 124B which extend to a rear portion of the spokes. Similarly, where the face portion comprises a disc configuration (not illustrated in FIG. 3), the first set of fibres 124A would extend to a front portion of the disc and a second set of fibres 124B which extend to a rear portion of the disc. This arrangement creates a strong fibre tie (and thus connection) between the face portion 104 and the connection 110.

Similarly, the first set of fibres 122 extend into the structure of the rim portion 102 in order to create a strong fibre tie (and thus connection) between the rim portion 102 and the connection 110.

In each layer of the transition zone 120, the reinforcement lay-up of the face portion 104 and the reinforcement lay-up of the rim portion 102 are matched. In this respect, each layer 125A, 125B and 125C includes a first section 127 comprising an arrangement of the first set of fibres 122 having a first connection end 128, and a second section 129 comprising an arrangement of the second set of fibres 124 having a second connection end 130. The first connection end 128 is arranged adjacent to or abutting the second connection end 130 forming respective layer joints 132A, 132B, 132C. The layer joints 132A, 132B, 132C of each adjoining layer 125A, 125B, 125C are spaced apart in a stepped configuration. This results in the upper and lower layers 125A, 125B, 125C of the layered structure bridging the intermediary layer joint 125A, 125B, 125C, thereby interconnecting the respective fibre reinforcement of the first section 127 and the second section 129 of the intermediary layer 125A, 125B, 125C. The stepped structure also ensures that the layer joint 132A, 132B, 132C of one layer 125A, 125B, 125C is aligned with another proximate layer joint 132A, 132B, 132C.

In the illustrated embodiment, the stepped configuration of the layer joints 132A, 132B, 132C comprises a linear stepped arrangement. Furthermore, the layer joints 132A, 132B, 132C of each adjoining layer 125A, 125B, 125C are preferably spaced apart with substantially the same lateral spacing. However, it should be appreciated that the particular step configuration and/or step spacing may be varied to suit particular configurations of strength requirements.

In the illustrated embodiment, the first set of fibres 122 from the rim portion 102 of the composite wheel 100 and the second set of fibres 124 from the face portion 104 of the composite wheel 100 comprise carbon fibres. However, it should be appreciated that a wide variety of fibres may be used in the present invention, including but not limited to carbon fibres, glass fibres, aramid fibres, synthetic fibres, bio fibres, mineral fibres, metal fibres, boron fibres or any combination of these.

In the illustrated embodiment, the layers 125A, 125B, 125C of the transition zone 120 and connection 110 are laid substantially parallel to a surface of the rim portion. However, it should be appreciated that the fibres 122, 124 may be provided in any desirable orientation in the transition zone 120. However, the fibres 122, 124 are preferably oriented to reduce the stress between the transition zone and the rim portion 102 and face portion 104 and/or reduce the stress between the rim portion 102 and face portion 104 as well as to strengthen areas of the final structure which will be exposed to a higher stress during service. The orientation of fibres 122, 124 therefore may or may not be the same in all of the layers 125A, 125B, 125C.

As shown in FIG. 3, the transition zone 120 is spaced away from the position/point 101 where the rim portion 102 meets the face portion 102 of the composite wheel 100. The arrangement allows for the connection 110 between the rim portion 102 and face portion 104 to be made at a position which is spaced away from the point 101 at which the structure of the face portion 104 meets the structure of the rim portion 102. This is advantageous since that location 101 is an area where the stresses in the structure are high during certain operational loading conditions.

Again, the fibres 122, 124 may be provided in any suitable form including in prepregs, semi-pregs, woven or non-woven fabrics, mats, pre-forms, pre-consolidated pre-forms, individual or groups of fibres, tows, tow-pregs, or the like. During lay-up of a connection 110, a matrix material, such as a resin need not be comprised in the layers comprising fibres or between the layers comprising fibres. However, the matrix material should form a continuous matrix after the curing.

The illustrated connection 110 can therefore be achieved in various ways:

In a first embodiment, the first set of fibres 122 and the second set of fibres 124 are provided as multi-axial fabric sheets or plys (not illustrated). Each ply can be cut to shape so as to fit in a specific location. The fabric, which could be either stitched together or woven, would contain fibres running in the most appropriate directions as discussed above.

In a second embodiment, the connection 110 and transition zone 120 thereof may be prepared as a pre-form (not illustrated). In such an embodiment, each of the first section 127 and second section 129 are formed into a tailored fibre preform having a desired shape and fibre orientation. For example, a tailored fibre preform may be created by laying down tow and stitching or binding the tow to form the desired shape and fibre orientation.

In some embodiments, the connection ends 128 and 130 of the first section 127 and second section 129 could be stitched, woven or otherwise joined together. In other embodiments, the connection ends 128 and 130 of the first section 127 and second section 129 may be only interconnected by the adjoining layers 125A, 125B, 125C and matrix material such as resin or metal impregnated therein.

A final capping layer 135 is added on the inside surface 114 of the rim portion 102 to cover the layer joint 132A, 132B, 132C structure once the face portion 104 and rim portion 102 reinforcement are assembled and the connection 110 layers 125A, 125B, 125C are laid. The capping layer 135 provides a final layer of reinforcement over the layer joint 132A proximate the inside surface 114 of the rim portion 102, and provides a finishing layer preferably matching the inside surface 114 of the rim portion 102. In the illustrated embodiment, the capping layer 135 comprises a layer of the first set of fibres 122 to match the inside surface 114 of the rim portion 102

The illustrated composite wheel 100 (FIG. 1) is intended to be formed as a unitary body. This involves simultaneous injection and/or impregnation of a matrix material, which in the exemplary embodiment is a resin, into all parts including the rim portion 102, face portion 104 and connection 110 and then curing of each of the portions of the composite wheel 100. The resin used is preferably epoxy-based. However, it should be understood that any suitable resin can be used for example unsaturated polyester, polyurethane, polyvinyl ester, epoxy, thermoplastics, similar chemical compounds or combinations thereof. A variety of resin delivery systems can be used including, but not limited to Resin Infusion and/or Resin Transfer Molding and/or Vacuum Assisted Resin Transfer Molding.

It should be appreciated that in other embodiments, a metal base matrix material may be used to form a metal composite matrix composite wheel 100.

In constructing a composite wheel illustrated in FIG. 1, the wheel includes three main mould faces. Firstly, a face mould, which is generally radially orientated relative to the axis of rotation of the wheel X-X. Secondly, an inner bucket mould face, which forms the inside face of the wheel 140 (FIG. 2). The inner bucket mould face includes a front face forming the back mould wall of the face portion which is radially orientated relative to the axis of rotation of the wheel X-X and side walls forming the back mould wall of the rim portion that are axially aligned to the axis of rotation of the wheel X-X. Thirdly, the rim moulds are substantially axially aligned to the axis of rotation of the wheel X-X.

In use, the rim portion 102 and face portion 104 are laid up with reinforcement and then the connection 110 is laid up with reinforcement. To facilitate this layup, the connection 110 is preferably located in a position between the rim portion 102 and face portion 104 that does not substantially hamper the layup procedure of rim portion 102 and face portion 104.

As shown in FIGS. 2 and 3, in some embodiments the connection 110 can be formed at a location 150 in the composite wheel 100 in which the direction of draft in the part changes. At this location 150, the direction or draft of the geometry between the rim portion 102 and face portion 104 changes. It should however be appreciated that the connection 110 could be located at any suitable position between the rim portion 102 and face portion 104, with the flexibility of fibres being utilised to orientate the connection 110 and at the selected location.

In the illustrated embodiments, the second fibres 124 of the connection 110 extending from the face portion 104 are axially aligned relative to the wheel axis X-X. The second fibres 124 extend substantially perpendicularly from joint position 141 on face portion 104 of the composite wheel 100. These second fibres 124 are therefore aligned around 90° relative to the radial alignment of the face portion 104 of the wheel. The first fibres 122 of the connection 110 extending from the rim portion 102 are axially aligned relative to the wheel axis X-X. These first fibres 122 extend laterally (at an angle of between 80 to 90°) from an edge of a flange portion 142 of the rim portion 102. This location places the second fibres 124 of the connection 110 above the hard section of the face portion mould face. The compliance of the fibres (and fabric thereof) enable these second fibres to be moved out of the way during assembly and then assembled in position aligned with, and adjacent to the lay-up of the rim portion 102 once the face portion 104 and rim portion 102 have been assembled.

In use, the connection 110 of the present invention can be assembled using the following steps:

A. providing in a first layer 125C, a first section comprising an arrangement of the first set of fibres having a first connection end, and a second section comprising an arrangement of the second set of fibres having an second connection end, the first connection end being arranged adjacent to or abutting the second connection end forming a layer joint;

B. providing further layers 125B, 125A over the first layer 125C having a similar configuration as the first layer 125C. However, the layer joint 132A, 132B, 132C of each adjoining layer 124A, 125B, 125C are arranged to be spaced apart in a stepped configuration; and C. providing a final capping layer 135 on the inside surface 114 of the rim portion 102 to cover the layer joint 132A, 132B, 132C structure.

It should be understood that in practice layers 125A, 125B and 125C can be included in the rim mould lay-up whereas the layers 124 are included in the face mould lay-up. The connection 110 of the present invention is created when the rim mould and face mould are assembled. The final capping layer 135 (or close out ply) 135 is added after the rim mould and face mould sections have been assembled together.

After forming the connection, a resin is injected and/or impregnated into the reinforcement of each of the rim portion 102, the face portion 104 and connection of the wheel and then allowed to cure.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A connection between a rim portion of a composite wheel including a first set of fibres and a face portion of the composite wheel including a second set of fibres, the connection comprising:
    a transition zone in which the first set of fibres and the second set of fibres are arranged in a layered structure, wherein each layer of the layer structure includes:
        a first section including an arrangement of the first set of fibres having a first connection end, and
        a second section including an arrangement of the second set of fibres having a second connection end, wherein the first connection end being arranged adjacent to or abutting the second connection end forming a layer joint, the layer joint of each adjoining layer being spaced apart in a stepped configuration.

2. The connection according to claim 1, wherein the layer joint of each layer is respectfully laterally spaced apart from the layer joint of each adjoining layer.

3. The connection according to claim 1, wherein the stepped configuration comprises a linear stepped arrangement.

4. The connection according to claim 1, wherein the layer structure comprises a plurality of stacked layers.

5. The connection according to claim 4, wherein each layer of the layer structure comprises a coplanar arrangement of the first section and the second section.

6. The connection according to claim 1, wherein the transition zone is spaced away from a position where the rim portion meets the face portion of the composite wheel.

7. The connection according to claim 1, wherein the composite wheel is formed about a central wheel axis, where the face portion includes the second set of fibres substantially radially aligned relative to the central wheel axis and the rim portion formed from the first set of fibres substantially axially aligned relative to the central wheel axis, and wherein the connection is formed from the second set of fibres extending from the face portion substantially axially aligned relative to the central wheel axis and the first set of fibres extending from the rim portion substantially axially aligned relative to the central wheel axis.

8. The connection according to claim 7, wherein the rim portion includes an edge flange portion which extends at an angle relative to the central wheel axis and the first set of fibres of the connection extend from the edge flange portion.

9. The connection according to claim 1, wherein at least some of the first set of fibres from the transition zone extend into the rim portion and at least some of the second set of fibres of the transition zone extend into the face portion of the composite wheel.

10. The connection according to claim 9, wherein at least a portion of the second set of fibres in the transition zone include a first set of second fibres which extend into a front portion of the face portion and a second set of second fibres which extend into a rear portion of the face portion of the composite wheel.

11. The connection according to claim 1, wherein each layer in the transition zone comprises oriented fibres that are either unidirectional fibres or biaxial fibres.

12. The connection according to claim 1, wherein the first set of fibres and the second set of fibres comprise carbon fibre fibres.

13. The connection according to claim 1, wherein the first set of fibres and the second set of fibres are provided as at least one fabric sheet.

14. The connection according to claim 1, wherein one or each of the first section and second section are formed from tailored fibre preform having a desired shape and fibre orientation.

15. The connection according to claim 1, further comprising at least one capping layer substantially extending over the stepped configuration of the layer joints.

16. The connection according to claim 1, further comprising a matrix material enveloping the first set of fibres and second set of fibres.

17. A method of connecting a rim portion and a face portion of a composite wheel, the rim portion of the composite wheel having a first set of fibres and the face portion of the composite wheel having a second set of fibres, the method comprising:

providing in a first layer a first section including an arrangement of the first set of fibres having a first connection end and a second section including an arrangement of the second set of fibres having a second connection end, wherein the first connection end being arranged adjacent to or abutting the second connection end forming a first layer joint;

providing at least one further layer over the first layer, the further layer having a further first section including an arrangement of a further first set of fibres having a further first connection end and a further second section including an arrangement of a further second set of fibres having a second connection end, wherein the further first connection end of the further layer being arranged adjacent to or abutting the further second connection end of the further layer forming a second layer joint; and wherein the layer joint of each adjoining layer is spaced apart in a stepped configuration.

18. The method of claim 17 further comprising connecting the rim portion and the face portion of the composite wheel using a connection between the rim portion and the face portion.

19. The method of claim 17, further comprising:

providing a matrix material in contact with each of the layers of the connection; and curing the connection.

\* \* \* \* \*

UNITED STATES PATENT AND TRADEMARK OFFICE
CERTIFICATE OF CORRECTION

PATENT NO. : 9,840,110 B2
APPLICATION NO. : 14/781199
DATED : December 12, 2017
INVENTOR(S) : Matthew Edward Dingle et al.

Page 1 of 1

It is certified that error appears in the above-identified patent and that said Letters Patent is hereby corrected as shown below:

On the Title Page

In the Abstract should read:
(57) ABSTRACT
A connection (110) between a rim portion (102) and a face portion (104) of a composite wheel (100). The rim portion (102) comprises a first set of fibers (122). The face portion (104) comprises a second set of fibers (124). The connection (110) comprises a transition zone (120) in which the first set of fibers (122) and the second set of fibers (124) are arranged in a layered structure. Each layer (125A, 125B, 125C) of the layer structure includes a first section (127) including an arrangement of the first set of fibers (122), and a first connection end (128), and a second section (129) including an arrangement of the second set of fibers (124), and a second connection end (130). The first connection end (128) is arranged adjacent to or abutting the second connection end (130) forming a layer joint (132A, 132B, 132C). The layer joint (132A, 132B, 132C) of each adjoining layer (125A, 125B, 125C) is spaced apart in a stepped configuration Signed and Sealed this
Tenth Day of December, 2019

Andrei Iancu
*Director of the United States Patent and Trademark Office*